(12) United States Patent
Kwong et al.

(10) Patent No.: US 8,826,417 B2
(45) Date of Patent: *Sep. 2, 2014

(54) PROVIDING A USER INPUT INTERFACE PRIOR TO INITIATION OF AN OPERATING SYSTEM

(75) Inventors: Wah Yiu Kwong, Beaverton, OR (US); Wayne L. Proefrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 12/961,800

(22) Filed: Dec. 7, 2010

(65) Prior Publication Data

US 2011/0078786 A1 Mar. 31, 2011

Related U.S. Application Data

(62) Division of application No. 10/020,701, filed on Dec. 12, 2001, now Pat. No. 7,849,301.

(51) Int. Cl.

| | |
|---|---|
| *G06F 21/00* | (2013.01) |
| *G06F 21/31* | (2013.01) |
| *G09G 5/36* | (2006.01) |
| *G06F 21/36* | (2013.01) |
| *G06F 3/14* | (2006.01) |

(52) U.S. Cl.
CPC .............. *G06F 21/36* (2013.01); *G06F 21/31* (2013.01); *G09G 5/363* (2013.01); *G06F 3/14* (2013.01)
USPC .................. 726/18; 726/16; 726/17; 726/19; 726/28; 715/764; 713/168; 713/182; 713/183; 713/192; 713/375; 710/305

(58) Field of Classification Search
CPC ......... G06F 21/35; G06F 21/31; G06F 21/34; G06F 21/575; G06F 2221/2149; G06F 3/14; G06F 3/1415; G06F 3/1431; G09G 5/363
USPC .......................................................... 726/18
See application file for complete search history.

(56) References Cited

U.S. PATENT DOCUMENTS

| | | | | |
|---|---|---|---|---|
| 4,570,217 | A | * | 2/1986 | Allen et al. ..................... 700/83 |
| 4,985,848 | A | * | 1/1991 | Pfeiffer et al. ................ 345/505 |
| 5,088,033 | A | * | 2/1992 | Binkley et al. ................. 703/24 |
| 5,148,155 | A | * | 9/1992 | Martin et al. ................. 345/173 |
| 5,233,502 | A | * | 8/1993 | Beatty et al. ............ 361/679.09 |
| 5,281,957 | A | * | 1/1994 | Schoolman ....................... 345/8 |

(Continued)

OTHER PUBLICATIONS

Megatel Computer, 'Overview-PC/II+i', Megatel Computer Corp., 1986, entire document, http://www.megatel.ca/html/embedded/4x4/sbc_2i.htm.*

(Continued)

*Primary Examiner* — Kambiz Zand
*Assistant Examiner* — Ronald Baum
(74) *Attorney, Agent, or Firm* — Trop, Pruner & Hu, P.C.

(57) ABSTRACT

A processor-based system, including systems without keyboards, may receive user inputs prior to booting. This may done using the graphics controller to generate a window which allows the user to input information. The system firmware may then compare any user inputs, such as passwords, and may determine whether or not to actually initiate system booting.

13 Claims, 3 Drawing Sheets

(56) References Cited

U.S. PATENT DOCUMENTS

| | | | |
|---|---|---|---|
| 5,379,057 A * | 1/1995 | Clough et al. | 345/173 |
| 5,402,492 A * | 3/1995 | Goodman et al. | 726/20 |
| 5,410,706 A * | 4/1995 | Farrand et al. | 713/2 |
| 5,468,947 A * | 11/1995 | Danielson et al. | 235/472.02 |
| 5,555,373 A * | 9/1996 | Dayan et al. | 726/34 |
| 5,558,638 A * | 9/1996 | Evers et al. | 604/66 |
| 5,576,734 A * | 11/1996 | Daniele et al. | 345/168 |
| 5,599,231 A * | 2/1997 | Hibino et al. | 463/29 |
| 5,610,981 A * | 3/1997 | Mooney et al. | 713/185 |
| 5,710,570 A * | 1/1998 | Wada et al. | 345/3.2 |
| 5,790,134 A * | 8/1998 | Lentz | 345/502 |
| 5,870,554 A * | 2/1999 | Grossman et al. | 713/2 |
| 5,872,515 A * | 2/1999 | Ha et al. | 340/571 |
| 5,892,902 A * | 4/1999 | Clark | 726/5 |
| 6,009,520 A * | 12/1999 | Gharda | 713/1 |
| 6,022,274 A * | 2/2000 | Takeda et al. | 463/44 |
| 6,049,871 A * | 4/2000 | Silen et al. | 713/2 |
| 6,065,053 A * | 5/2000 | Nouri et al. | 709/224 |
| 6,098,171 A * | 8/2000 | Johnson et al. | 726/16 |
| 6,134,631 A * | 10/2000 | Jennings, III | 711/117 |
| 6,151,678 A * | 11/2000 | Davis | 726/35 |
| 6,160,213 A * | 12/2000 | Arnold et al. | 84/615 |
| 6,202,160 B1 * | 3/2001 | Sheikh et al. | 713/310 |
| 6,240,516 B1 * | 5/2001 | Vainsencher | 713/190 |
| 6,275,933 B1 * | 8/2001 | Fine et al. | 713/2 |
| 6,304,244 B1 * | 10/2001 | Hawkins et al. | 345/502 |
| 6,356,965 B1 * | 3/2002 | Broyles et al. | 710/104 |
| 6,449,682 B1 * | 9/2002 | Toorians | 711/100 |
| 6,454,652 B2 * | 9/2002 | Miyamoto et al. | 463/31 |
| 6,463,537 B1 * | 10/2002 | Tello | 713/182 |
| 6,480,097 B1 * | 11/2002 | Zinsky et al. | 340/5.8 |
| 6,557,756 B1 * | 5/2003 | Smith | 235/379 |
| 6,560,641 B1 * | 5/2003 | Powderly et al. | 709/219 |
| 6,647,498 B1 * | 11/2003 | Cho | 726/17 |
| 6,763,458 B1 * | 7/2004 | Watanabe et al. | 713/100 |
| 6,769,036 B1 * | 7/2004 | Cortopassi et al. | 710/15 |
| 6,779,004 B1 * | 8/2004 | Zintel | 709/227 |
| 6,791,572 B1 * | 9/2004 | Cloney et al. | 345/619 |
| 6,825,846 B2 * | 11/2004 | Mondal | 345/547 |
| 6,839,853 B2 * | 1/2005 | Odaohhara et al. | 713/300 |
| 7,000,249 B2 * | 2/2006 | Lee | 726/20 |
| 7,100,030 B1 * | 8/2006 | Sakamaki et al. | 713/1 |
| 7,178,165 B2 * | 2/2007 | Abrams | 726/23 |
| 7,178,167 B1 * | 2/2007 | Katoh et al. | 726/26 |
| 7,461,249 B1 * | 12/2008 | Pearson et al. | 713/156 |
| 7,506,381 B2 * | 3/2009 | Sormunen et al. | 726/30 |
| 2002/0087877 A1 * | 7/2002 | Grawrock | 713/200 |
| 2002/0140857 A1 * | 10/2002 | Limaye | 348/515 |
| 2003/0005276 A1 * | 1/2003 | French et al. | 713/2 |

OTHER PUBLICATIONS

Apple Computer, Inc., 'Newton MessagePad 110' [product spec sheet], 1994 Apple Computer, Inc., entire document, http://www.svas.com/computers/mp110.pdf.*

* cited by examiner

PROVIDING A USER INPUT INTERFACE PRIOR TO INITIATION OF AN OPERATING SYSTEM

CROSS-REFERENCE TO RELATED APPLICATIONS

This application is a divisional of U.S. patent application Ser. No. 10/020,701, filed Dec. 12, 2001, which issued as U.S. Pat. No. 7,849,301.

BACKGROUND

This invention relates generally to processor-based systems and particularly to techniques for providing user inputs in those systems.

A number of processor-based systems, such as web tablets, include no keyboard. For example, many devices use a touch screen, a mouse, or pen as the input device, avoiding the need for a keyboard that takes up more space. However each of these input devices generally needs an operating system in order to receive user inputs.

In some cases, the inability to provide inputs prior to booting of the operating system may create a problem. For example, it may be desirable to require the user to enter a password before actually booting the operating system. Once the operating system is booted, the user may be more able to hack the system in order to gain access without a password. Thus it may be advantageous to require entry of a password or other identifier before booting the system.

As another example, it may be desirable for the user to provide certain information to the system, such as hardware settings, prior to actually booting the system. In other words it may be desirable to enable the input of setting information without requiring that the operating system be booted. Examples of machine setup information may be to convert the system from a universal serial bus (USB) to a PS-2 system, to provide different graphics, or to provide a different hard drive.

Of course in systems without a keyboard, there is no way to provide information prior to the time the operating system has booted. Before operating system boot or in the pre-boot phase, the input devices are incapacitated since they require a functioning operating system.

Therefore, there is a need for a way to receive inputs in processor-based systems in the pre-boot phase.

DETAILED DESCRIPTION

Figure 1:
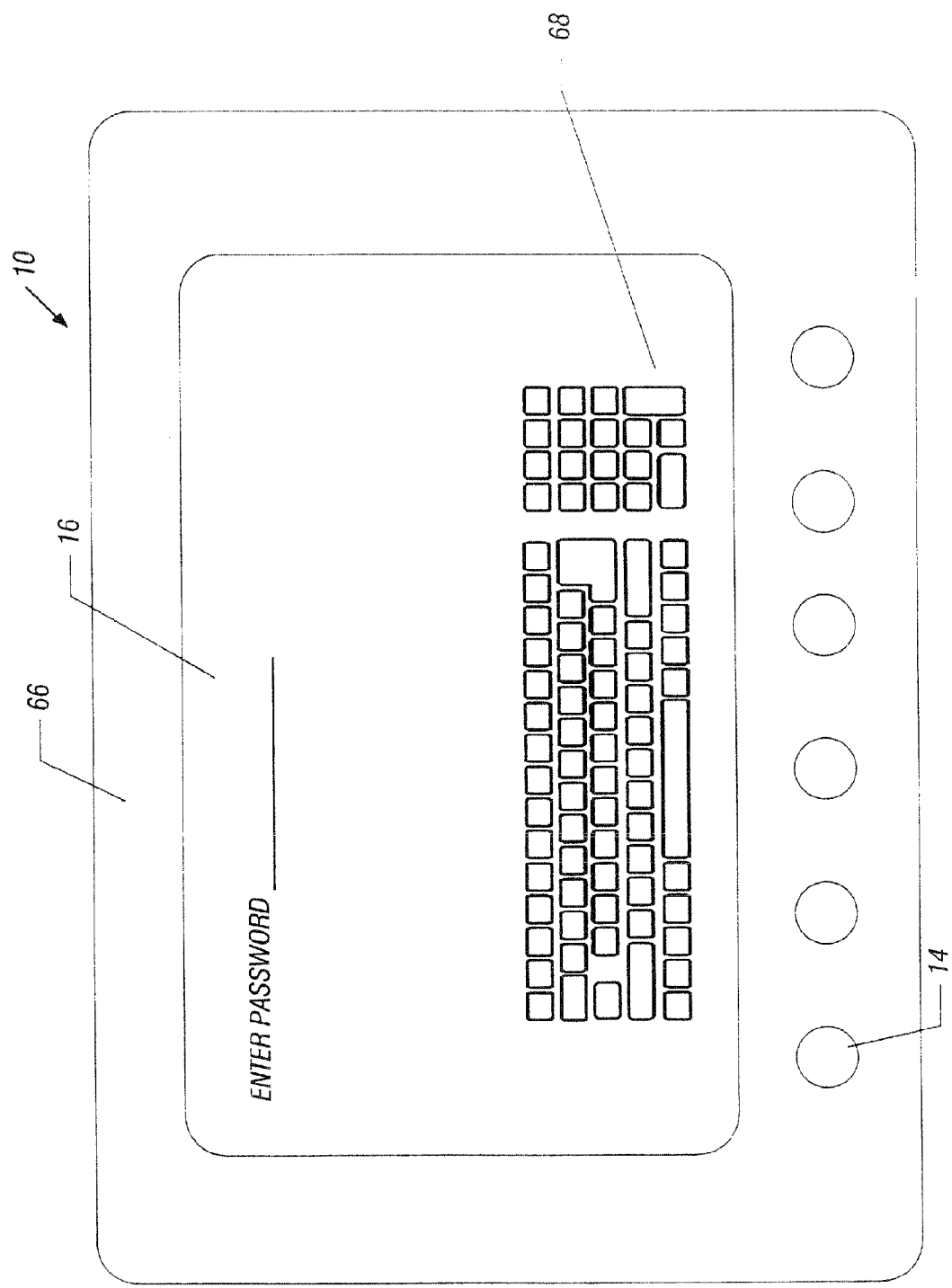
FIG. 1 is a front plan view of one embodiment of the present invention.

Referring to FIG. 1, a processor-based system 10 may include a housing 66 and a display 16. In one embodiment, the display 16 may be a liquid crystal display and the processor-based system 10 may be battery powered. The system 10 may include no keyboard. Instead, the system 10 may use input devices such as a touch screen, a pen, or a mouse. Textual inputs may be entered prior to booting an operating system using an on-screen keyboard image included in a graphical user interface 68.

Examples of systems 10 include personal digital assistants, appliances such as cameras, and web tablets. These devices may be more portable and relatively lower in weight by eliminating the keyboard.

Referring to FIG. 1, when the user operates a start button 14, the graphical user interface 68 appears including a prompt to enter a password and an on-screen keyboard. This may be done before the operating system has been booted. Instead, the interface 68 may be retrieved from storage and displayed by opening a window.

When the user enters an appropriate password, as determined by boot code running in a graphics controller, booting of the operating system may be initiated in one embodiment. In other embodiments, entry of machine settings or other identifiers may be provided in the pre-boot stage.

Figure 2:
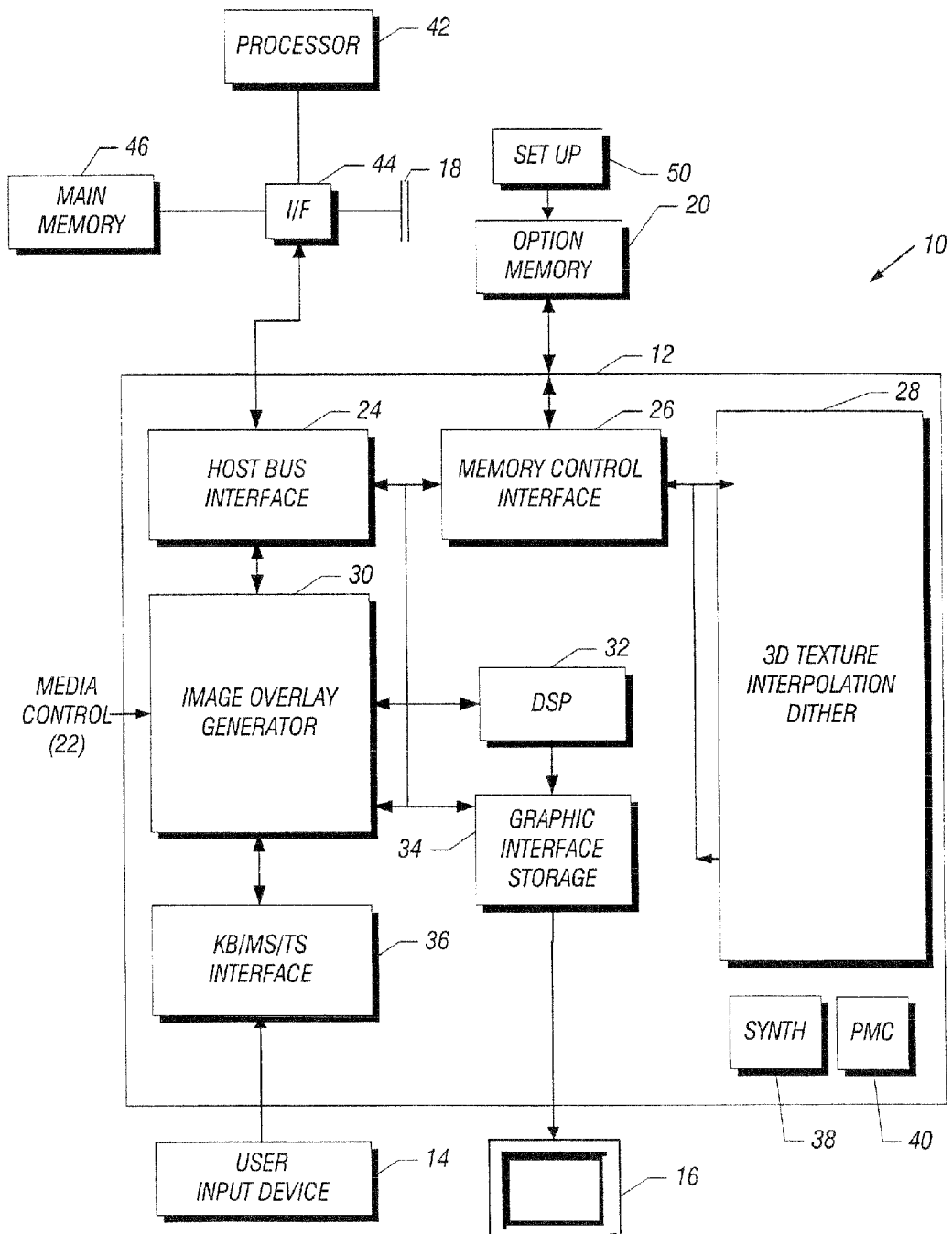
FIG. 2 is a block depiction of the embodiment shown in FIG. 1 in accordance with one embodiment of the present invention.

Turning to FIG. 2, the system 10 may include a processor 42 coupled through an interface 44 to a graphics controller 22. The main memory 46 may be coupled to the interface 44 as may be a bus 18. The graphics controller 42 may receive inputs from a user input device 14 such as a mouse, a pen, or a touch screen display. Media control inputs 22 may be received by an image overlay generator 30. The image overlay generator 30 actually generates the interface 68. An interface 36 provides an interface between the generator 30 and the user interface 14.

A host bus interface 24 may be coupled through the interface 44 to the processor 42 and the main memory 46. A memory control interface 26 may couple the interface 24 to an option memory 20 such as an option read only memory (ROM). In addition, a digital signal processor (DSP) 32 and a graphic image storage 34 may be provided. The graphic image storage 34 stores an image that may be provided from the option memory 20 to generate the interface 68 and eventually displays the interface 68 on a display 16. Thus the graphic interface storage 34 may be a frame buffer or other memory that is capable of storing an image for display on the display 16. A 3-D graphics coprocessor 28 may be utilized for 3-D interpolation applications. A clock synthesizer 38 and a power management controller 40 may be provided as well.

The set up software 50 may be stored in the option memory 20, in one embodiment, for actually initiating the generation of an interface 68 during the pre-boot stage. Thus, the set up software 50 may be run from the graphics controller loaded with code from an option memory or any other software operable during the pre-boot stage.

Figure 3:
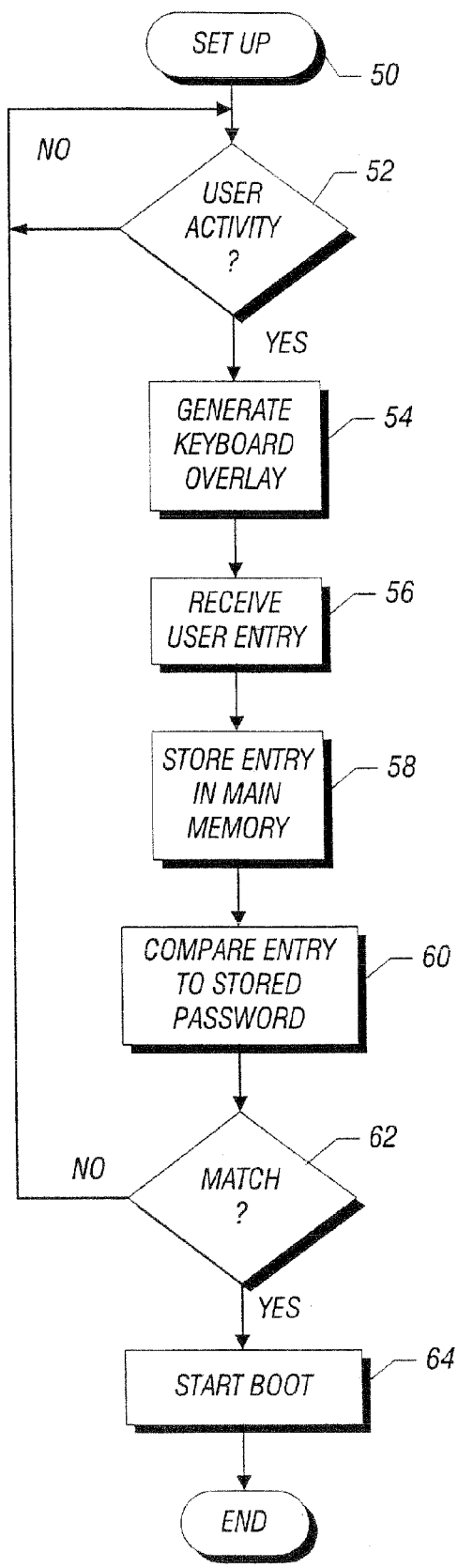
FIG. 3 is a flow chart for software in accordance with one embodiment of the present invention.

Referring to FIG. 3, when user activity is detected, as indicated in block 52, the interface 68 is generated as indicated in block 54. The user activity may be operation of the button 14 indicating that the user wishes to initiate the system. Once the interface 68 is generated, the user inputs, such as a password, may be received through the interface 68 as indicated in block 56. The password entry may be part of the boot code stored in an option memory 20 as indicated in block 58. The entry may then be compared to a stored password necessary to gain access to the system 10 as indicated in block 60. If the graphics controller boot code determines that there is a password match in diamond 62, the boot operation may be started as indicated in block 64 in accordance with one embodiment of the present invention.

Thus, in some embodiments, even in systems without a keyboard, a graphical user interface 68 may be generated prior to booting of the system and this interface 68 may receive user inputs, for example to authenticate the user and to enable booting to occur. This may result in a more secure system than a system in which booting precedes user authentication. In other embodiments, machine settings or other identifiers may be advantageously received in the pre-boot stage before the available user input devices are operable. In some embodiments no operative hard disk or floppy drive is needed to start to use the system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising: a hardware processor having an operating system associated with a storage; the storage coupled to said hardware processor; and a hardware graphics controller, not an integral part of said hardware processor, coupled to said storage to generate, before a boot sequence initiates for said hardware processor, a graphical user interface before the operating system associated with the storage of said hardware processor has booted, said hardware graphics controller to monitor for a user input, receive a user input in said interface, and based on said input decide whether to issue a signal to cause said hardware processor to boot the hardware processor's operating system associated with the storage.

2. The system of claim 1 wherein said system does not include a keyboard.

3. The system of claim 1 including a touch screen display.

4. The system of claim 1 wherein said storage stores instructions that enable the hardware processor to automatically boot the operating system when a user input is received through a graphical user interface before the operating system is booted.

5. The system of claim 1 including an option read only memory that stores information used to generate a graphical user interface for the entry of a password prior to booting of an operating system.

6. An apparatus comprising: a first hardware processor having an operating system associated with a storage; and a hardware graphics controller coupled to said first hardware processor, but said hardware graphics controller not an integral part of said first hardware processor, said hardware graphics controller to generate, before a boot sequence initiates the operating system associated with the storage for said first hardware processor and without the assistance of said first hardware processor, a graphical user interface to receive a password
before an operating system associated with the first hardware processor boots, said hardware graphics controller to monitor said graphical user interface for said password, compare said password to stored information and to initiate booting of said operating system associated with the storage only after comparing said password to said stored information.

7. The apparatus of claim 6, said apparatus including an option memory, said hardware graphics controller to store information used for generating said graphical user interface on an option memory.

8. The apparatus of claim 6, said hardware graphics controller to use boot code to generate the graphical user interface.

9. The apparatus of claim 6, said hardware graphics controller to generate a graphical user interface to enable the user to input a password.

10. The apparatus of claim 9, said hardware graphics controller to generate an on screen keyboard as said graphical user interface.

11. The apparatus of claim 6, said graphical user interface to enable user inputs to be received without a keyboard.

12. The apparatus of claim 6 wherein said operating system only boots if the user has been authenticated.

13. The apparatus of claim 6, said hardware graphics controller to receive a password entered without a keyboard using the graphical user interface.

* * * * *